Aug. 14, 1951     H. E. BECK     2,564,319
GATHERER FOR CORN HARVESTERS
Filed Sept. 24, 1947

INVENTOR
Henry E. Beck
BY Thiess Olson & Mecklenburger
ATTY'S

Patented Aug. 14, 1951

2,564,319

UNITED STATES PATENT OFFICE 2,564,319

GATHERER FOR CORN HARVESTERS

Henry E. Beck, Racine, Wis., assignor to J. I. Case Company, Racine, Wis., a corporation of Wisconsin Application September 24, 1947, Serial No. 775,821

8 Claims. (Cl. 56—119)

This invention relates to corn harvesters and more particularly to corn pickers having snapping rolls for breaking corn ears from the stalks wherein one of the snapping rolls is adjustable relative to the other. A particular object of this invention is the provision of an improved support for the snapping rolls of a corn picker.

In the operation of corn pickers of the prior art difficulty is sometimes encountered during operation in the accumulation of weeds and other foreign material against the supports which connect the snapping rolls and adjacent frame members, thus interfering with the proper operation of the snapping rolls. Another difficulty is frequently encountered when it is desired to enlarge the space between the adjustable rolls. In prior art constructions it has been necessary to loosen an adjustable roll by a hammer or mallet prior to readjustment. This practice often results in damage to the machine. Accordingly, it is one object of this invention to provide supports for the forward ends of the snapping rolls of a corn picker arranged in a manner substantially to prevent a choking condition which may be caused by the accumulation of weeds or other foreign material adjacent the snapping rolls.

Another object of this invention is to provide improved means for adjusting the space between the snapping rolls without necessitating additional adjustments of the adjacent frame members to which they are secured.

A further object of this invention is to provide an inexpensive, as well as a durable, support for said snapping rolls.

A still further object of this invention is the provision of readily adjustable supports for the snapping rolls of a corn picker which, in association with the gathering chains and other associated parts of the machine, will insure proper operation under all normal conditions of use.

Further and additional objects will appear from the following description, the accompanying drawing, and the appended claims.

In accordance with one embodiment of this invention a corn picker is provided having a pair of forwardly and downwardly extending snapping rolls including means for adjusting one of the rolls relative to the other, thus allowing for a variations in the spacing between the rolls through which the stalks of corn pass during operation. The forward ends of the snapping rolls are journalled on the rearwardly extending ends of a pair of forwardly diverging, curved stalk-guiding rods which are rigidly attached at their forward end mounted on forwardly extending parallel frame members of the corn picker. The shoulder blocks are welded or otherwise secured to the stalk-guiding rods in such a manner that no obstructions are presented in those surfaces of the rods which face each other thereby insuring that the stalks are smoothly guided to the picker rolls and thereby preventing weed accumulation. Also, in accordance with this invention, there is provided threaded means arranged between one of said shoulder blocks and a frame member for readily adjusting the corresponding snapping roll with respect to the other in either direction.

For a more complete understanding of this invention reference will now be made to the accompanying drawing wherein.

Figure 1:
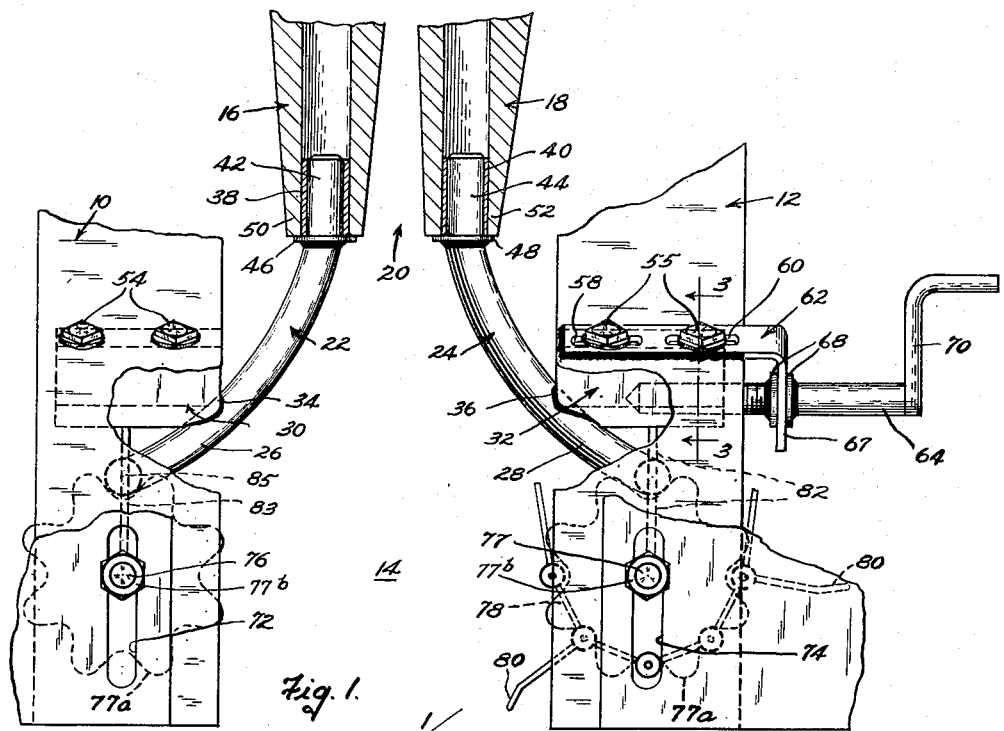
Figure 1 is a view taken normally to the plane 1—1 of Fig. 2 showing the forward end portion of a corn picker constructed in accordance with one embodiment of this invention, illustrating the snapping rolls in section, portions of the adjacent frame members cut away, supporting shoulder blocks, and a portion of one gathering mechanism.

Referring now to the drawing, a corn picker (not shown) is provided having a pair of forwardly extending parallel frame members 10 and 12 forming sprocket supporting brackets arranged to provide between the forward ends thereof a passage 14 through which cornstalks pass during progression of the picker down a row of corn. A pair of downwardly inclined and forwardly extending snapping rolls 16 and 18 are mounted on the picker, the rear ends of the rolls being supported and driven in any desired manner (not shown) and the forward ends terminating within the passage 14. The peripheral surfaces of rolls 16 and 18 are tapered and provide a divergent opening 20 to which the cornstalks are guided from the passage 14 by means of support and stalk-guiding rods 22 and 24 forming roll-supporting brackets. These rods extend forwardly from the forward ends of said snapping rolls 16 and 18 and are curved upwardly and outwardly and are attached at their forward end portions 26 and 28 by welding or other suitable means to Said rods 22 and 24 are of uniform cross section and are formed from common stock material, thus providing a simple, durable and inexpensive support for the forward ends of the snapping rolls. It will be noted that the shoulder blocks 30 and 32 are secured to the respective rods 22 and 24 at points 34 and 36 removed from passage 14, whereby the rod faces adjacent the passage 14 provide a clear, unobstructed guide for the stalks to the divergent opening 20. The description of said blocks 30 and 32 will be discussed more fully later. The snapping rolls 16 and 18 are mounted to rotate oppositely to each other, that is inwardly and downwardly toward the divergent opening 20, during operation of the picker in order to provide the desired snapping effect to the stalks at the upper rear portion of the snapping rolls 16 and 18.

Figure 3:
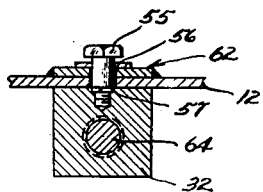
Fig. 3 is a sectional view of the adjustable shoulder block taken along the line 3—3 of Fig. 1.

Into the lower front ends of snapping rolls 16 and 18 are pressed bearing sleeves 38 and 40 into which the rear ends 42 and 44 of the guide rods 22 and 24 are journalled. Collars 46 and 48 are rigidly fixed to rods 22 and 24 and bear against the ends 50 and 52 of the snapping rolls 16 and 18 and thus seal the bushing against the entrance of dirt. Shoulder block 30 to which support and stalk-guiding rod 22 is attached at point 34 is rigidly mounted on parallel frame member 10 by means of clamping bolts 54 and is held in a fixed position in respect to the adjacent frame member 10. Said clamping bolts 54 are passed through frame member 10 and are threaded into shoulder block 30. Thus the supporting rod 22 and snapping roll 16 are held in a fixed position relative to the adjacent frame member 10. The block 32 to which the support and stalk-guiding rod 24 is attached at point 36 is adjustable in a lateral direction relative to the adjacent frame member 12 and thus allows for movement of snapping roll 18 relative to snapping roll 16. Shoulder block 32 is secured in slidable relationship to the frame member 12 by means of guide bolts 55, said bolts passing through frame member 12 and threaded into shoulder block 32. Slots 58 and 60 are cut through an L-shaped bracket 62 which is rigidly attached by welding or any other suitable means to the frame member 12, and said slots 58 and 60 are also cut through the adjacent frame member 12, thus providing a pair of elongated slots in fixed registering relationship. The bolts 55 pass through said slots and thus guide the block 32 in lateral movement with respect to the frame member 12. As most clearly shown in Fig. 3, bolts 55 are prevented from tightly clamping block 32 to the frame 12 by the shouldered shanks 56 of said bolts 55. A lock washer 57 located between the shouldered shank 56 and block 32 prevents the bolts from working loose when the corn picker is in operation. Thus it will be seen that block 32 is secured to the frame by bolts 56 in such a manner as to permit relative movement thereof limited by the size of the slots 58 and 60.

In order to effect this relative movement, and a corresponding relative movement of snapping roll 18 with respect to snapping roll 16, positioning screw 64 is threaded into the adjustable shoulder block 32 and is swivelly mounted on the adjacent frame member 12 by means of the L-shaped bracket 62. A U-shaped slot 66 is provided in the downwardly extending portion 67 of the L-shaped bracket 62 into which the positioning screw 64 is swivelled. The positioning screw is restrained from endwise movement by a pair of collars 68 rigidly attached to the shank thereof. Enough clearance is provided between the inside faces of the said collars 68 to receive the downwardly extending portion 67 of the L-shaped bracket 62 and thus allowing the positioning screw 64 to turn in a tangential direction about its longitudinal axis. A handle 70 is rigidly attached to the outer end of positioning screw 64 to facilitate turning of said positioning screw inwardly or outwardly, thus alleviating the need for using a mallet or hammer to move the adjustable snapping roll outwardly. Thus the adjustable block 32, the supporting and stalk-guiding rod 24, and the snapping roll 18 are held in the desired position by positioning screws 64.

Figure 2:
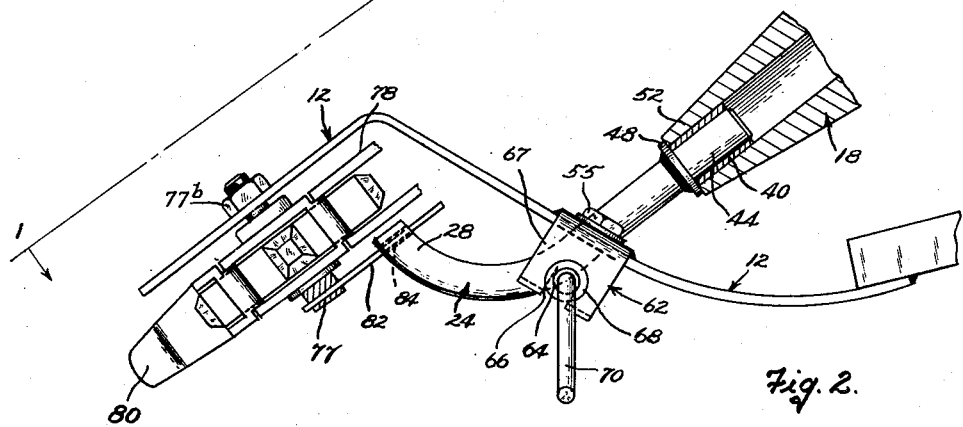
Fig. 2 is a fragmentary side elevational view of the corn picker of Fig. 1 illustrating the adjustable snapping roll and adjacent frame member, the adjustable snapping roll and a portion of the gathering chain sprocket journal being shown in section.

Forward of the shoulder blocks 30 and 32 on the adjacent frame members 10 and 12 are provided slots 72 and 74, into which the usual gathering chain sprocket journals 76 and 77 pass, thus allowing the gathering chain sprocket journals to be moved in a forward direction for tightening the respective gathering chains 78 (only one of which is shown in the drawing). As shown in Figs. 1 and 2, the forwardly and upwardly extending portions of the brackets 12 and 24 are embraced between the runs of the gathering chains 78, respectively. The journals 76 and 77 are threaded at their upper ends and secured on the brackets by nuts 77b. Gathering chain 78 is provided with a plurality of fingers 80 which gather the stalks and convey them through the snapping rolls. Fingers 80 also aid in moving the snapped ears rearwardly to a conveyor (not shown) for distribution. A flexible rod 82 extends between the forward end of the support and stalk-guiding rod 24 to the gathering chain sprocket journal 77 for the sprockets 77a and thus prevents weeds or other foreign material from collecting and hooking over the forward end 28 of the said rod 24. A like function is provided by rod 83 for support rod 22. Both rods 82 and 83 extend through holes 84 and 85 provided at the forward ends of stalk-guiding rods 24 and 22. The loose fit of the rod 82 in hole 84 allows freedom of lateral adjustment of snapping roll 18. Rods 82 and 84 are secured in holes in sprocket journals 76 and 77 by welding or other suitable means.

It will be seen from the foregoing description that a simple, durable, and inexpensive support has been provided for the snapping rolls. By means of the handle attached to the positioning screw, a quick and accurate way is provided for closing or opening the space between the rolls without requiring the use of a hammer or mallet. Also the arrangement for mounting the rolls on the adjacent frame member alleviates the difficulty of foreign materials choking up the rolls and frame members and thereby hindering the operation of the rolls. The rods being made from common stock material also reduces the cost of manufacturing to a considerable extent.

While a particular embodiment of this invention is shown above, it will be understood, of course, that the invention is not to be limited thereto, since many modifications may be made and it is contemplated, therefore, by the appended claims, to cover such modifications as fall within the true spirit and scope of this invention.

Having thus described the invention, what is claimed and desired to be secured by Letters Patent is:

1. In a corn picker, a pair of substantially parallel spaced-apart downwardly- and forwardly-extending rolls between which the stalks are passed as the picker advances, and means for rotatably supporting the lower front ends of said rolls and guiding the stalks to be passed between said rolls comprising a pair of roll-supporting brackets, one for each roll, on which the lower front ends of the rolls are mounted, respectively, a pair of gathering chain-supporting sprockets, a second pair of laterally-spaced forwardly-extending brackets on which the sprockets and the first pair of brackets are mounted, respectively, and means for adjusting one of said first brackets toward and from the other to change the spacing between said rolls, each of said second pair of brackets having a bearing member mounted thereon on which said sprockets are mounted, respectively.

2. In a corn picker, a pair of substantially parallel spaced-apart downwardly- and forwardly-extending rolls between which the stalks are passed as the picker advances, and means for rotatably supporting the lower front ends of said rolls and guiding the stalks to be passed between said rolls comprising a pair of roll-supporting brackets, one for each roll, on which the lower front ends of the rolls are mounted, respectively, a pair of gathering chain-supporting sprockets, a second pair of laterally-spaced forwardly-extending brackets on which the sprockets and the first pair of brackets are mounted, respectively, and means for adjusting one of said first brackets toward and from the other to change the spacing between said rolls comprising a crank swiveled on one of said second pair of brackets and having a threaded engagement with one of said first pair of brackets, each of said second pair of brackets having a bearing member mounted thereon on which said sprockets are mounted, respectively.

3. In a corn picker, a pair of substantially parallel spaced-apart downwardly- and forwardly-extending rolls between which the stalks are passed as the picker advances, and means for rotatably supporting the lower front ends of said rolls and guiding the stalks to be passed between said rolls comprising a pair of roll-supporting brackets, one for each roll, on which the lower front ends of the rolls are mounted, respectively, a pair of gathering chain-supporting sprockets, a second pair of laterally spaced forwardly-extending brackets on which the sprockets and the first pair of brackets are mounted, respectively, said sprockets lying in a generally downwardly- and forwardly-extending plane, the connections between said pairs of brackets lying below said plane, and the portions of said second pair of brackets on which said sprockets are mounted lying above said plane, each of said second pair of brackets having a bearing member mounted thereon on which said sprockets are mounted, respectively.

4. In a corn picker, a pair of substantially parallel spaced-apart downwardly- and forwardly-extending rolls between which the stalks are passed as the picker advances, and means for rotatably supporting the lower front ends of said rolls and guiding the stalks to be passed between said rolls comprising a pair of roll-supporting brackets, one for each roll, on which the lower front ends of the rolls are mounted, respectively, a pair of gathering chain-supporting sprockets, a second pair of laterally-spaced forwardly-extending brackets on which the sprockets and the first pair of brackets are mounted, respectively, and means for adjusting one of said first brackets toward and from the other to change the spacing between said rolls, said sprockets lying in a generally downwardly- and forwardly-extending plane, the connections between said pairs of brackets lying below said plane, and the portions of said second pair of brackets on which said sprockets are mounted lying above said plane, each of said second pair of brackets having a bearing member mounted thereon on which said sprockets are mounted, respectively.

5. In a corn picker, a pair of substantially parallel spaced-apart downwardly- and forwardly-extending rolls between which the stalks are passed as the picker advances, and means for rotatably supporting the lower front ends of said rolls and guiding the stalks to be passed between said rolls comprising a pair of roll-supporting brackets, one for each roll, on which the lower front ends of the rolls are mounted, respectively, a pair of gathering chain-supporting sprockets, a second pair of laterally-spaced forwardly-extending brackets on which the sprockets and the first pair of brackets are mounted, respectively, said sprockets lying in a generally downwardly- and forwardly-extending plane, the connections between said pairs of brackets lying below said plane, and the portions of said second pair of brackets on which said sprockets are mounted lying above said plane, the mountings for said sprockets comprising journals extending downwardly from said second pair of brackets, respectively, on which journals said sprockets are mounted.

6. In a corn picker, a pair of substantially parallel spaced-apart downwardly- and forwardly-extending rolls between which the stalks are passed as the picker advances, and means for rotatably supporting the lower front ends of said rolls and guiding the stalks to be passed between said rolls comprising a pair of roll-supporting brackets, one for each roll, on which the lower front ends of the rolls are mounted, respectively, a pair of gathering chain-supporting sprockets, a second pair of laterally-spaced forwardly-extending brackets on which the sprockets and the first pair of brackets are mounted, respectively, said sprockets lying in a generally downwardly- and forwardly-extending plane, the connections between said pairs of brackets lying below said plane, and the portions of said second pair of brackets on which said sprockets are mounted lying above said plane, the mountings for said sprockets comprising journals extending downwardly from said second pair of brackets, respectively, on which journals said sprockets are mounted, and guard means extending between said journals and said first brackets, respectively, for preventing foreign material from entering between said brackets.

7. In a corn picker, a pair of substantially parallel spaced-apart downwardly- and forwardly-extending rolls between which the stalks are passed as the picker advances, and means for rotatably supporting the lower front ends of said rolls and guiding the stalks to be passed between said rolls comprising a pair of roll-supporting brackets, one for each roll, on which the lower front ends of the rolls are mounted, respectively, a pair of gathering chain-supporting sprockets, a second pair of laterally-spaced forwardly-extending brackets on which the sprockets and the first pair of brackets are mounted, respectively, said sprockets lying in a generally downwardly- and forwardly-extending plane, the connections between said pairs of brackets lying below said plane, and the portions of said second pair of brackets on which said sprockets are mounted lying above said plane, the mountings for said sprockets comprising journals extending downwardly from said second pair of brackets, respectively, on which journals said sprockets are mounted, and guard means extending between said journals and said first brackets, respectively, for preventing foreign material from entering between said brackets, said guard means comprising a flexible rod for engaging both brackets.

8. In a corn picker, a pair of substantially parallel spaced-apart downwardly and forwardly extending rolls between which the stalks are passed as the picker advances, and means for rotatably supporting the lower front ends of said rolls and guiding the stalks to be passed between said rolls comprising a pair of roll supporting brackets, one for each roll, on which the lower front ends of the rolls are mounted, respectively, a pair of gathering chain-supporting sprockets, and a second pair of laterally spaced forwardly extending brackets on which the sprockets and the first pair of brackets are mounted, respectively, each of said second pair of brackets having a bearing member mounted thereon on which said sprockets are mounted, respectively.

HENRY E. BECK.

REFERENCES CITED

The following references are of record in the file of this patent:

UNITED STATES PATENTS

| Number | Name | Date |
|---|---|---|
| 482,945 | Hanson et al. | Sept. 20, 1892 |
| 656,714 | Bowker | Aug. 28, 1900 |
| 746,738 | Pelton | Dec. 15, 1903 |
| 786,239 | Stone | Mar. 28, 1905 |
| 1,611,002 | Davis | Dec. 14, 1926 |
| 2,004,711 | Thieman | June 11, 1935 |
| 2,180,594 | Kuhlman | Nov. 21, 1939 |
| 2,210,341 | Rund, Jr. | Aug. 6, 1940 |
| 2,334,945 | Mitchell et al. | Nov. 23, 1943 |